US010733757B2

(12) United States Patent
Gupta et al.

(10) Patent No.: US 10,733,757 B2
(45) Date of Patent: Aug. 4, 2020

(54) TRAILER ASSIST SYSTEM WITH ESTIMATION OF 3D LOCATION OF HITCH

(71) Applicant: Magna Electronics Inc., Auburn Hills, MI (US)

(72) Inventors: Nikhil Gupta, Brampton (CA); Galina Okouneva, Markham (CA); Hilda Faraji, Toronto (CA); Jyothi P. Gali, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/408,613

(22) Filed: May 10, 2019

(65) Prior Publication Data

US 2019/0347825 A1 Nov. 14, 2019

Related U.S. Application Data

(60) Provisional application No. 62/669,438, filed on May 10, 2018.

(51) Int. Cl.

| | |
|---|---|
| ***H04N 7/18*** | (2006.01) |
| ***G06T 7/73*** | (2017.01) |
| *B60R 11/04* | (2006.01) |
| *B60R 11/00* | (2006.01) |
| *B60R 1/00* | (2006.01) |
| *B60D 1/36* | (2006.01) |

(52) U.S. Cl.

CPC ............... *G06T 7/73* (2017.01); *H04N 7/183* (2013.01); *B60D 1/36* (2013.01); *B60R 1/00* (2013.01); *B60R 11/04* (2013.01); *B60R 2011/004* (2013.01); *B60R 2300/607* (2013.01); *B60R 2300/808* (2013.01); *G06T 2207/30252* (2013.01)

(58) Field of Classification Search

CPC . H04N 7/18; H04N 7/183; G60D 1/36; G60R 1/00; G60R 11/04; G60R 2011/004; G60R 2300/607; G60R 2300/808; G06T 7/73; G06T 2207/30252

USPC ..................... 348/148, 116; 382/103; 701/26

See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,690,268 | B2 | 2/2004 | Schofield et al. |

(Continued)

*Primary Examiner* — Trang U Tran

(74) *Attorney, Agent, or Firm* — Honigman LLP

(57) ABSTRACT

A trailer assist system for a vehicle includes a camera with a field of view encompassing a trailer hitch disposed at the vehicle. A control includes an image processor that processes image data captured by the camera that is representative of images of the trailer hitch present in the field of view of the camera. The control, responsive to processing at the control of image data captured by the camera, detects at least one feature of the trailer hitch at a Cartesian coordinate location and transforms the Cartesian coordinate location of the detected feature to a cylindrical coordinate location. The control generates a vertical segment that passes through the detected features and determines cylindrical coordinates of a ground point along the vertical segment. The control, responsive to determining the cylindrical coordinates of the ground point, determines a 3D location of the trailer hitch at the vehicle.

20 Claims, 9 Drawing Sheets

(56) References Cited

U.S. PATENT DOCUMENTS

| | | | | |
|---|---|---|---|---|
| 7,005,974 | B2 | 2/2006 | McMahon et al. | |
| 7,038,577 | B2 | 5/2006 | Pawlicki et al. | |
| 7,720,580 | B2 | 5/2010 | Higgins-Luthman | |
| 7,855,755 | B2 | 12/2010 | Weller et al. | |
| 9,085,261 | B2 | 7/2015 | Lu et al. | |
| 9,205,776 | B2 | 12/2015 | Turk | |
| 9,914,333 | B2 * | 3/2018 | Shank | B62D 15/0285 |
| 10,332,002 | B2 * | 6/2019 | Bliss | B62D 15/0295 |
| 10,346,705 | B2 * | 7/2019 | Naserian | B60D 1/36 |
| 10,452,931 | B2 * | 10/2019 | Gupta | G06K 9/00798 |
| 10,552,976 | B2 * | 2/2020 | Diessner | G06T 7/73 |
| 2011/0050903 | A1 * | 3/2011 | Vorobiev | A01B 69/003<br>348/148 |
| 2014/0085472 | A1 | 3/2014 | Lu et al. | |
| 2014/0160276 | A1 | 6/2014 | Pliefke et al. | |
| 2015/0002670 | A1 | 1/2015 | Bajpai | |
| 2015/0217693 | A1 | 8/2015 | Pliefke et al. | |
| 2017/0050672 | A1 | 2/2017 | Gieseke et al. | |
| 2017/0217372 | A1 | 8/2017 | Lu et al. | |
| 2017/0254873 | A1 | 9/2017 | Koravadi | |
| 2018/0211528 | A1 | 7/2018 | Seifert | |
| 2018/0215382 | A1 | 8/2018 | Gupta et al. | |
| 2018/0253608 | A1 | 9/2018 | Diessner et al. | |
| 2018/0276838 | A1 | 9/2018 | Gupta et al. | |
| 2018/0276839 | A1 | 9/2018 | Diessner et al. | |
| 2018/0341823 | A1 | 11/2018 | Gupta | |
| 2019/0016264 | A1 | 1/2019 | Potnis et al. | |
| 2019/0064831 | A1 | 2/2019 | Gali et al. | |

* cited by examiner

Cylindrical view

TRAILER ASSIST SYSTEM WITH ESTIMATION OF 3D LOCATION OF HITCH

CROSS REFERENCE TO RELATED APPLICATION

The present application claims the filing benefits of U.S. provisional application Ser. No. 62/669,438, filed May 10, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle, with one of the cameras having a field of view exterior of the vehicle with the field of view including the hitch. The vision system provides a control that includes an image processor operable to process image data captured by the camera. The image data is representative of images of the hitch. The control, responsive to image processing by the processor of image data captured by the camera, detects at least one feature of the hitch at a Cartesian coordinate location and transforms the Cartesian coordinate location of the detected feature to a cylindrical coordinate location. The control, responsive to transforming the Cartesian coordinate location of the detected feature to the cylindrical coordinate location, determines a three-dimensional (3D) location of the hitch.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The vision system includes an image processor or image processing system that is operable to receive image data from one or more cameras and may provide an output to a display device for displaying images representative of the captured image data. Optionally, the vision system may provide display, such as a rearview display or a top down or bird's eye or surround view display or the like.

Figure 1:
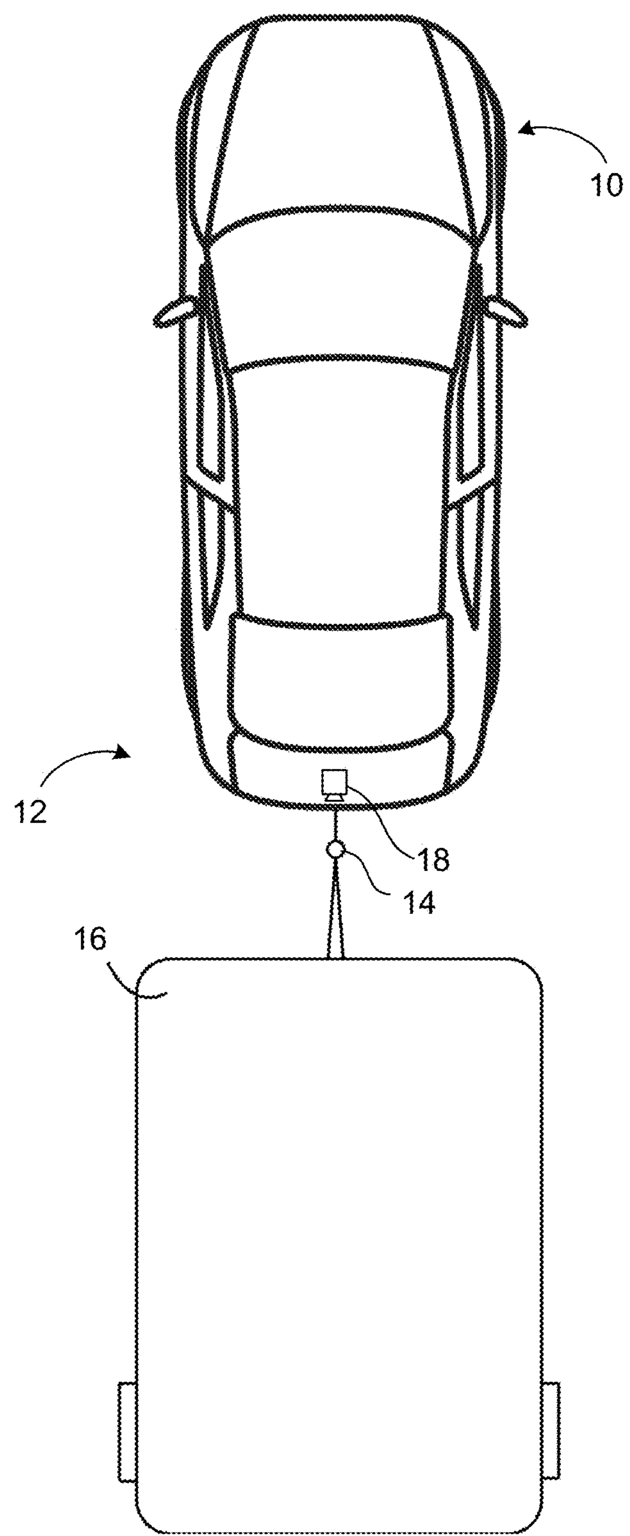
FIG. 1 is a plan view of a vehicle with a trailer assist system that is operable to determine a three-dimensional (3D) location of a hitch in accordance with the present invention.

Referring now to the drawings and the illustrative embodiments depicted therein, a vehicle 10 includes a trailer maneuver assist system 12 that is operable to determine a three-dimensional (3D) location of a hitch 14 and may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14, with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
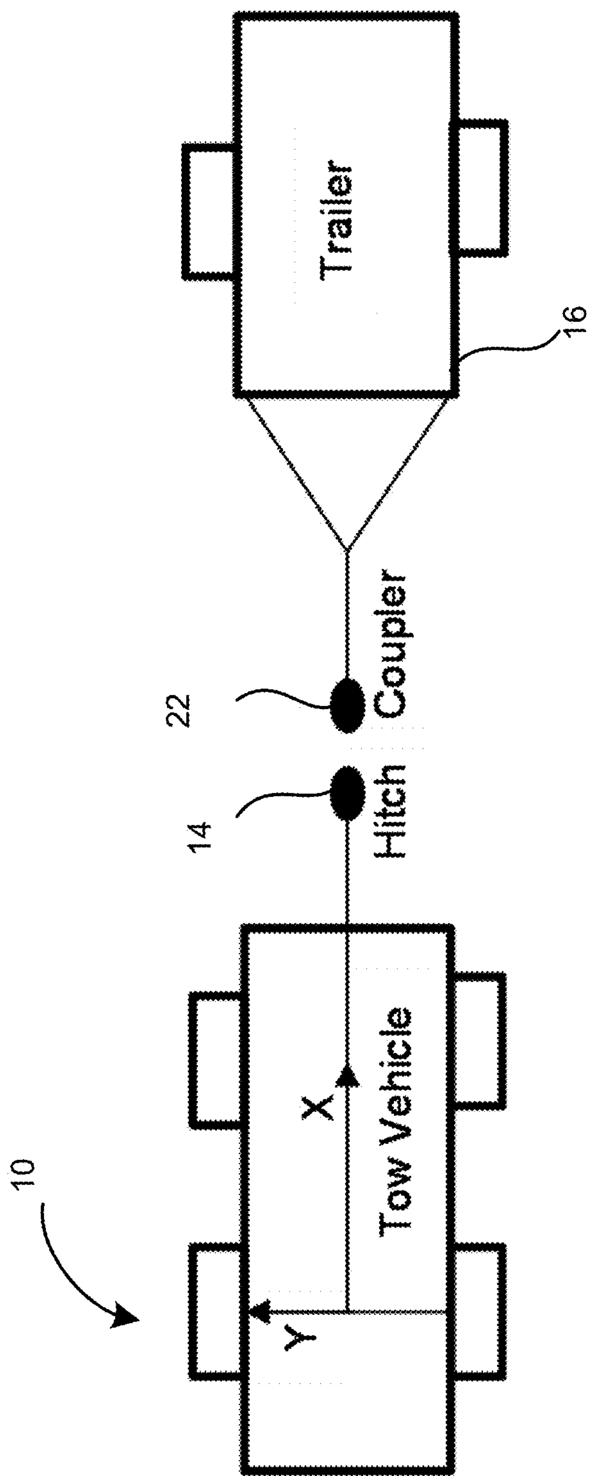
FIG. 2 is a schematic of a vehicle and trailer showing an x and y coordinate system.
Figure 3B:
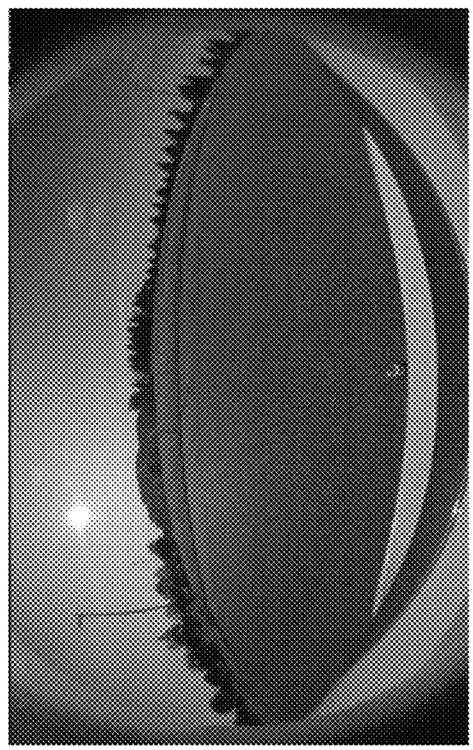
FIGS. 3A and 3B are exemplary images of hitches that are disposed at a vehicle.
Figure 3A:
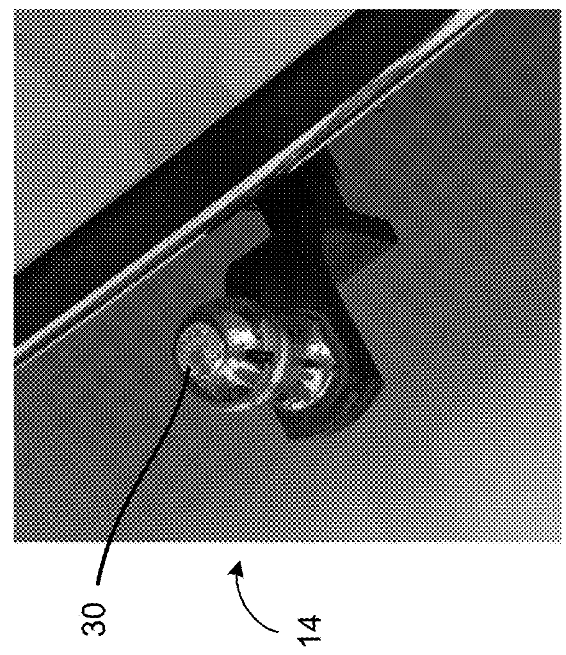

Referring now to FIG. 2, the hitch 14 couples the tow vehicle 10 to the trailer 16 and the trailer's coupler 22. Illustrated in FIG. 2 are the corresponding x and y axes with respect to the vehicle 10. In order to support coupling of the tow vehicle 10 and the trailer 16 (e.g., autonomously backing the vehicle toward the trailer) and accurately determining trailer angle during driving, an accurate 3D location of the hitch 14, or more specifically, a hitch ball 30 of the hitch 14 (FIG. 3A) is desirable. Typically, the rear view camera 18 (having a wide angle or fisheye lens) provides a fisheye view or image of the hitch 14 as illustrated in FIG. 3B. To determine a 3D location from such a 2D image, the control detects at least one feature or point of the hitch 14 or hitch ball 30 (e.g., a point at the top of the hitch ball 30) and transforms the detected feature from a two-dimensional (2D) Cartesian coordinate location to a 2D cylindrical coordinate location.

Figure 4:
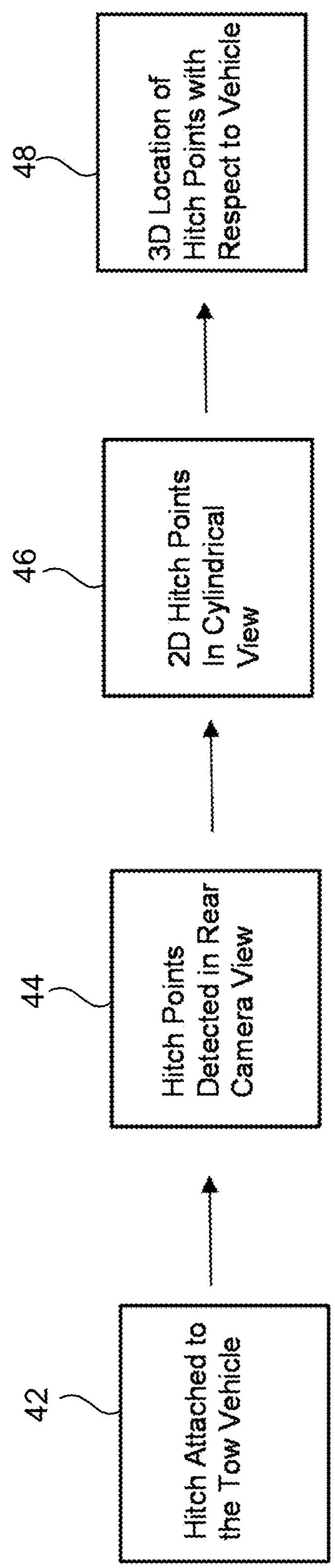
FIG. 4 is a flow chart for determining the 3D location of a hitch disposed at a vehicle in accordance with the present invention.

Referring now to FIG. 4, a flow chart illustrates determining the 3D location. First, the hitch 14 is attached to the vehicle 10 at 42. At 44, the control detects the hitch features through the image data captured by camera 18. The control transforms the 2D hitch points to a cylindrical coordinate location at 46. At 48, the control determines the 3D location of the detected feature of the hitch 14 with respect to the vehicle 10.

The control may also be operable to generate a bounding box around the hitch 14, and the control detects the hitch features or points within the bounding box. The control may detect the features using any number of detection algorithms, such as speeded up robust features (SURF), scale-invariant feature transform (SIFT), binary robust invariant scalable keypoints (BRISK), etc. The control may also, after conversion to cylindrical coordinates, be operable to generate a vertical line or segment through the detected feature of the hitch 14. A primary property of the cylindrical view is that a vertical line in the cylindrical view also represents a vertical line in the 3D "real world". Therefore, a 3D detected hitch point projected onto the ground is located on the vertical line in the cylindrical space.

Figure 5:
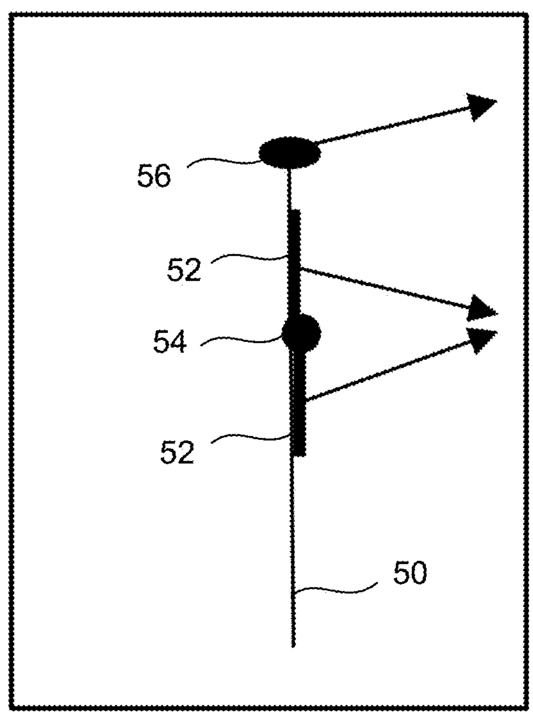
FIG. 5 is a schematic of a hitch cylindrical coordinate location and segments accordance with the present invention.

Referring now to FIG. 5, in some examples, the control is operable to select a segment 52 of the vertical line 50 where the segment 52 includes a potential ground point 54 representative of where the ground point corresponding to the detected hitch point 56 can potentially be located. The control may determine or select a minimum height and a maximum height of the hitch. For example, the control may determine that the minimum height of the hitch is 100 mm and the maximum height of the hitch is 700-800 mm. The minimum height and the maximum height may be selected from predetermined typical hitch heights and/or from previously determined hitch heights. Using the selected minimum height and the maximum height, the control may generate a segment extending below the detected hitch point and the segment will include or pass through the true ground point.

For a selected cylindrical point $p_c$ on the selected segment 52 (e.g., cylindrical image coordinates of the point p ($x_{pc}$, $y_{pc}$)), the control is operable to apply a filter to the point and to determine if the point is within a threshold distance of the potential ground point 54. That is, the control may denote the corresponding coordinate of $p_c$ on a CCD array of the camera as $x_{pa}$, $y_{pa}$ and may also denote the detected hitch point coordinates on the CCD array as $x_{ha}$, $y_{ha}$. The coordinates $x_{pa}$, $y_{pa}$ are dependent upon point $p_c$ such that $x_{pa}=x_{pa}(p_c)$ and $y_{pa}=y_{ap}(p_c)$. These projective equations (assuming that the intrinsic and extrinsic calibration values for the camera are known) may be derived into the function:

$$F = \text{abs}\left(\frac{x_{ha}}{x_{pa}(p_c)} - \frac{y_{ha}}{y_{pa}(p_c)}\right) \quad (1)$$

Figure 6:
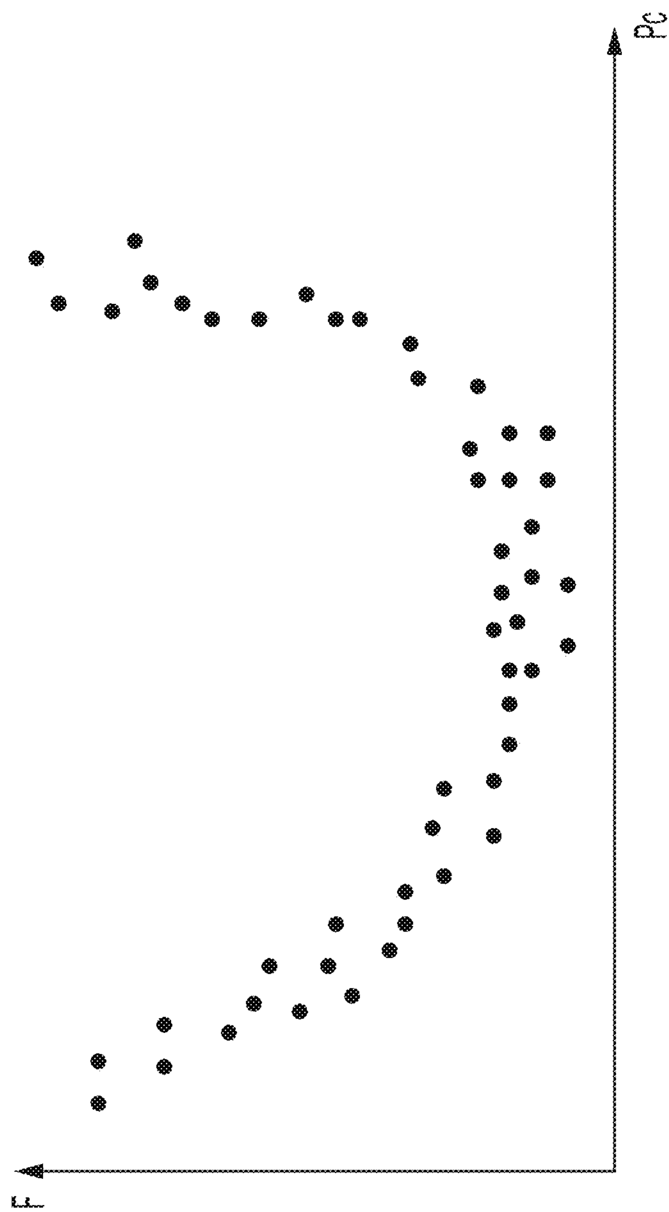
FIG. 6 is a plot of a function that is used to determine potential ground points in accordance with the present invention.
Figure 7B:
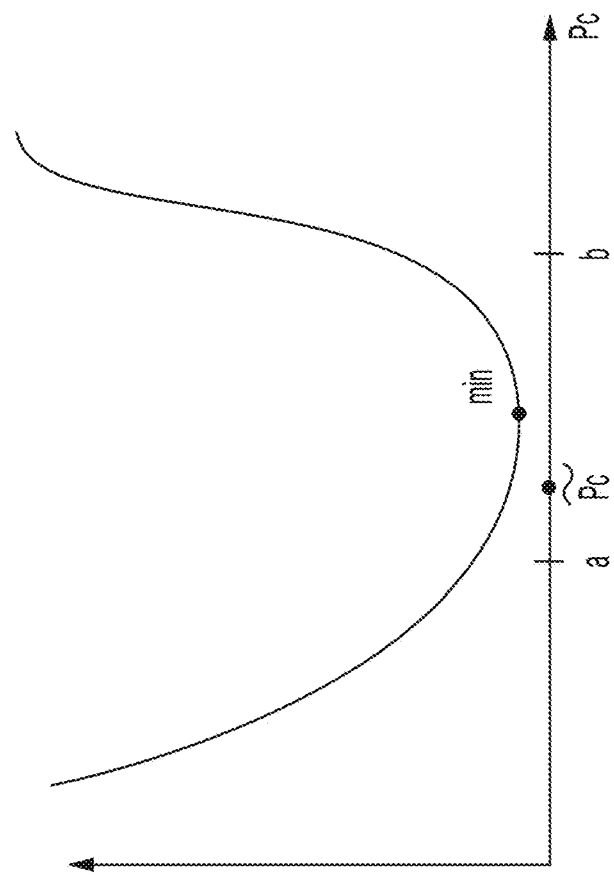
FIGS. 7A and 7B are plots for determining a minimum of the plot of FIG. 6.
Figure 7A:
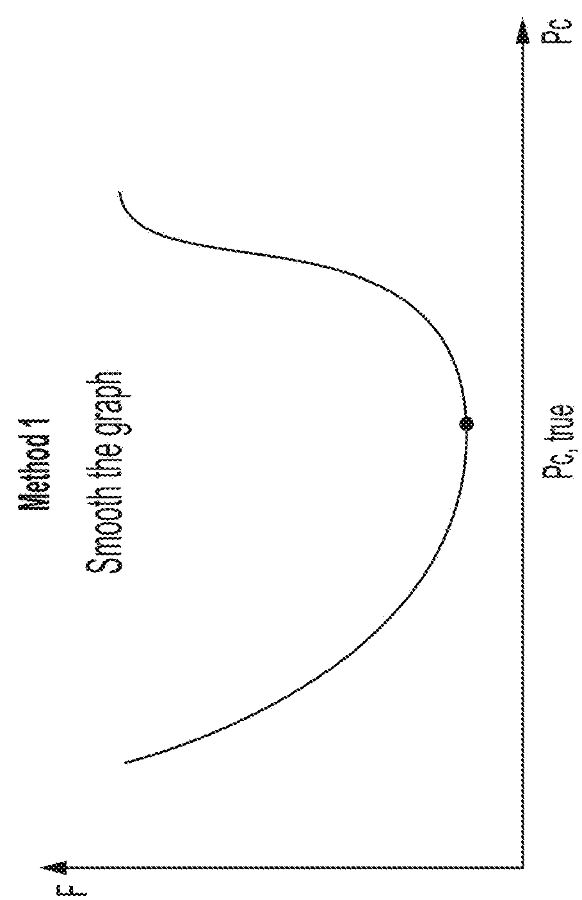

Equation (1) attains a minimum if the point pc is the ground point for the true height of the hitch. FIG. 6 illustrates an exemplary plot of the function of equation (1). Because of noise in the data, the exact minimum is not apparent. Any appropriate method may be used to alleviate the noise and estimate the minimum of the function of equation (1) and obtain the point $p_c$ corresponding to the true height of the hitch. For example, and with reference to FIGS. 7A and 7B, the plot of FIG. 6 may be smoothed (FIG. 7A) to find the minimum of the graph by considering an interval around a point (FIG. 7B).

Figure 8:
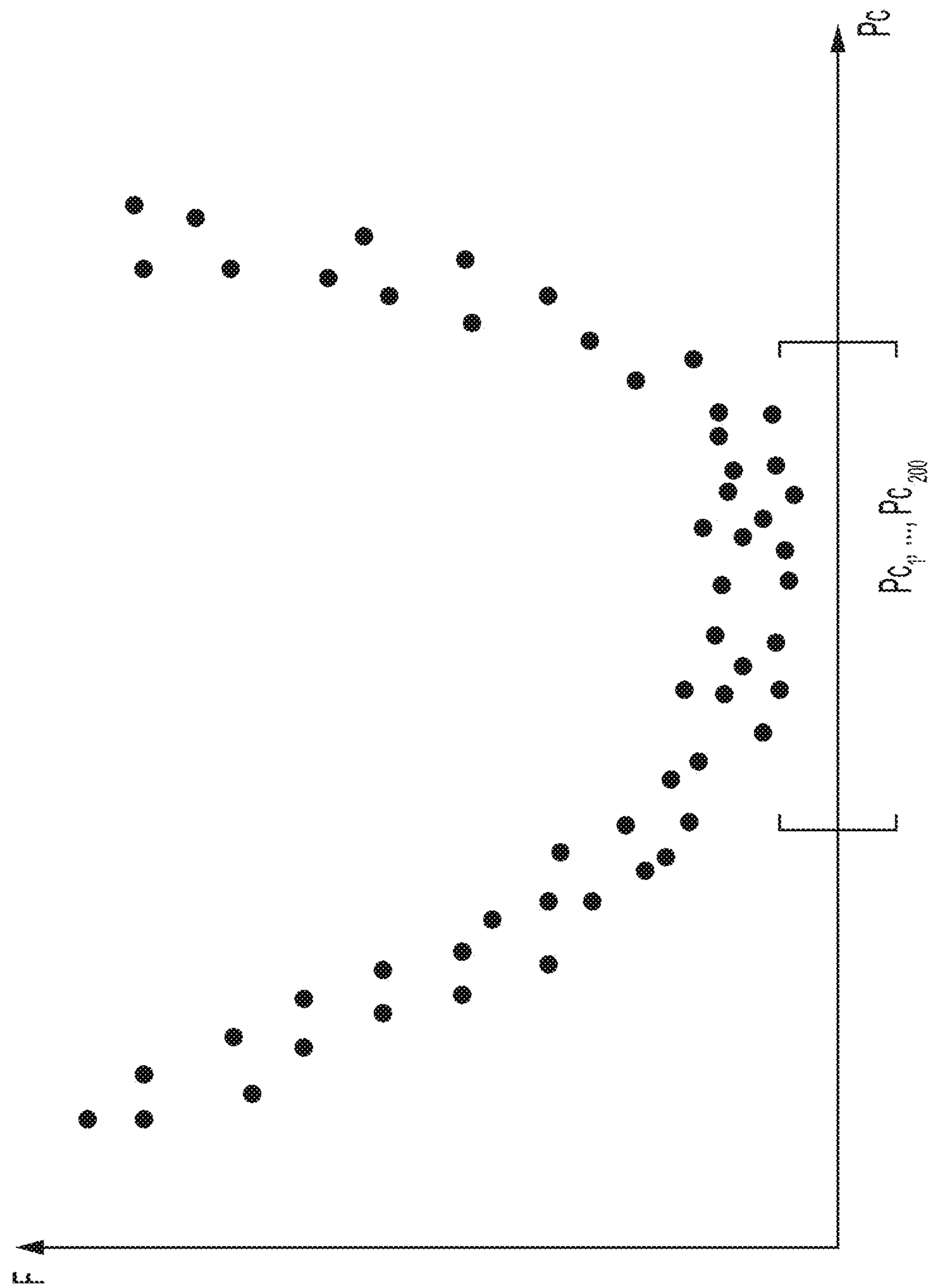
FIG. 8 is another plot for determining the minimum of the plot of FIG. 6.

For each point that is within the threshold, the control is operable to determine a z coordinate (i.e., height) within the cylindrical coordinates. For example, for each point $\tilde{p}_c$ [a, b] (i.e., for each point between a and b), using the projective equations, the height (i.e., the z coordinate) of the point may be determined (FIG. 7B). Referring now to FIG. 8, another method for estimating the minimum of the function of equation (1) is illustrated. In this method, the values of the function may be sorted in ascending order and the corresponding values of pc may also be sorted accordingly. For example, if $F_s=[f_1, f_2, \ldots, f_{200}, f_{201}]$, then $P_{cs}=[p_{c1}, p_{c2}, \ldots, p_{c200}, p_{c2001}]$. Once sorted, a threshold number of values may be selected (e.g., the first 200 values) and the z coordinate (i.e., the height) for each may be determined. Points along these intervals are in located in a charged-couple device (CCD) array space (i.e., correspond to locations on the image sensor) and represent real 3D points which are close to the actual or true ground point of the hitch.

Regardless of the method used, the control is operable to determine an average of the determined height (i.e., z coordinate) of each point within the threshold distance and determine a z coordinate of a 3D location of the hitch 14 based on the average. The control may be operable to determine an x coordinate and a y coordinate of the 3D location of the hitch 14 based on the averaged z coordinate of the 3D location of the hitch 14 (e.g., using projective equations). With the x, y, and z coordinates determined, the control determines the 3D location of the detected hitch point, and correspondingly, the 3D location of the hitch 14. The control, in some implementations, is operable to determine a respective 3D location of the hitch 14 in a plurality of image frames (e.g., determine a 3D location in each of a succession of frames of captured image data). The control averages the respective 3D locations to determine an averaged 3D location. The control may repeat this process for any number of detected features or points, and then average the determined 3D location of each point.

Because a hitch is rigidly attached to a vehicle, many typical location estimations are not possible, as the estimations are dependent upon motion. However, the present vision system may estimate a 3D location using just a single image of the hitch or hitch ball to estimate its 3D location, including its height from the ground and length. The system does not require the use of training images from a database of hitch ball images to be effective.

Figure 9:
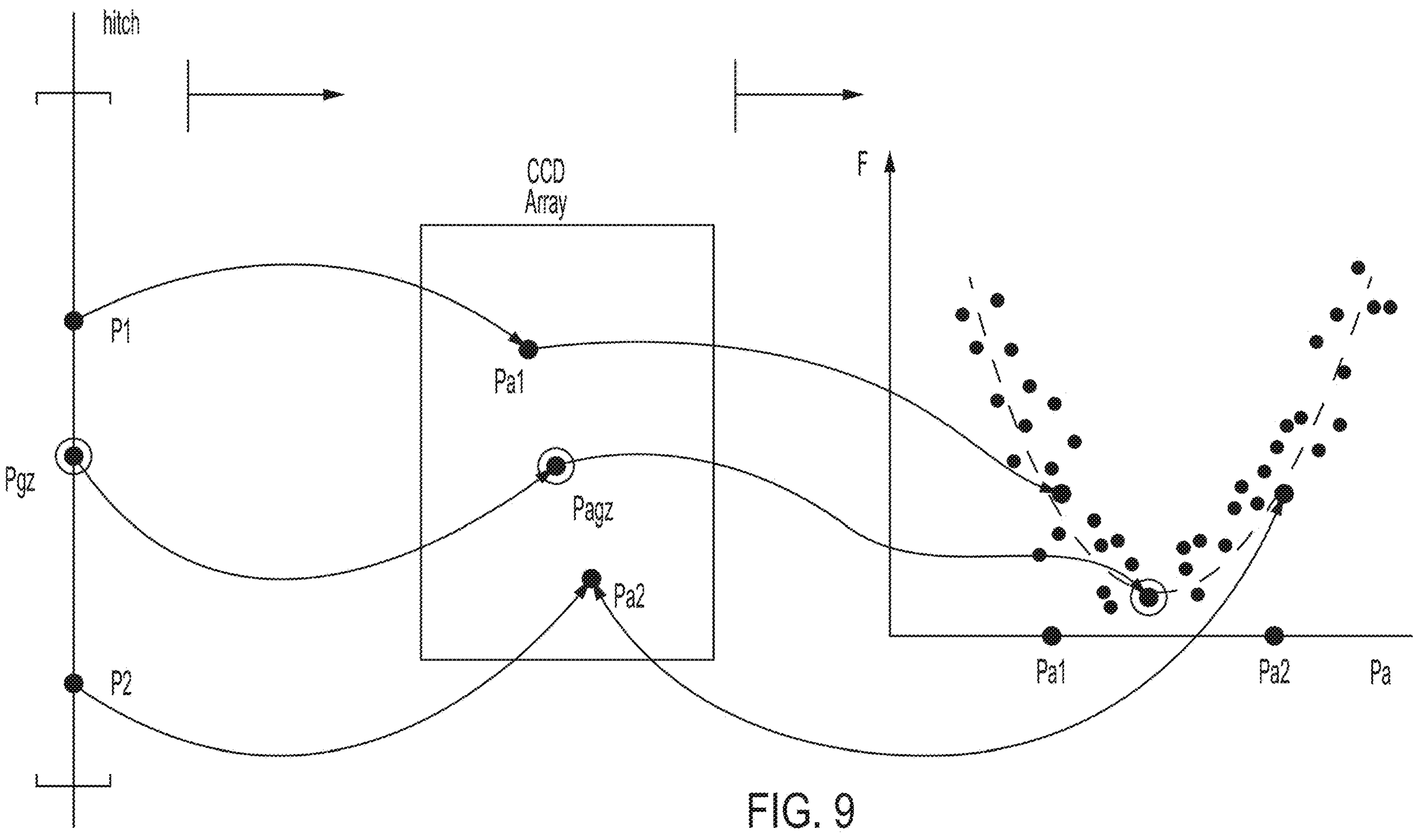
FIG. 9 is a schematic view of transforming potential ground points.

Referring now to FIG. 9, in some examples, image data captured by the camera may, in addition to Cartesian space and cylindrical space (i.e., coordinates), be transformed into and between a fisheye space and a dewarped (rectangular) space. That is, image data captured by the camera may be freely transformed to and from the CCD array space (i.e., the raw image data), a fisheye space, a dewarped rectangular space, and the cylindrical space. In the CCD array space, image points are represented on the camera CCD array and coordinate values of the points are very small numbers.

In some implementations, the hitch is detected in the fisheye space while the previously described projective equations operate in CCD array and dewarped image spaces. The vertical selected segment is applied in cylindrical space. That is, after the hitch is detected in fisheye space, the hitch point may be transformed to the dewarped space, and from the dewarped space, the hitch point may be transformed to the CCD array space. After selecting the vertical segment in the cylindrical space, each point selected from the segment may be transformed back to the CCD array space to construct the plot of the function of equation (1) (FIG. 9). That is, the minimum of the function of equation (1) corresponds to a point in the CCD array space, and this point, when transformed back into the fisheye space, is the true ground point for the hitch.

The system of the present invention thus determines a three dimensional location relative to the vehicle and the ground and uses this determined location to assist in maneuvering the vehicle towards a trailer for hitching the trailer to the hitch of the vehicle. The system may autonomously control the vehicle toward the trailer or may provide guidance or assistance to a driver of the vehicle in maneuvering the vehicle toward the trailer. The system provides an enhanced determined location of the hitch in three dimensional space to provide enhanced maneuvering of the vehicle and hitch toward a trailer for hitching the trailer to the hitch of the vehicle.

The system may utilize aspects of the trailering or trailer angle detection systems or trailer hitch assist systems described in U.S. Pat. Nos. 9,085,261 and/or 6,690,268, and/or U.S. Publication Nos. US-2019-0064831; US-2019-0016264; US-2018-0276839; US-2018-0276838; US-2018-0253608; US-2018-0215382; US-2018-0211528; US-2017-0254873; US-2017-0217372; US-2017-0050672; US-2015-0217693; US-2014-0160276; US-2014-0085472 and/or US-2015-0002670, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663;

7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailer assist system for a vehicle, the trailer assist system comprising:
- a camera disposed at a rear portion of a vehicle and having a field of view exterior of the vehicle, the field of view encompassing a trailer hitch disposed at the vehicle;
- a control comprising an image processor that processes image data captured by the camera, wherein the image data captured by the camera is representative of images of the trailer hitch viewed by the camera;
- wherein, responsive to processing at the control of image data captured by the camera, at least one feature of the trailer hitch is detected at a Cartesian coordinate location, and wherein the detected Cartesian coordinate location of the detected feature is transformed at the control to a cylindrical coordinate location;
- wherein the control generates a vertical segment that passes through the detected feature;
- wherein the control determines cylindrical coordinates of a ground point along the vertical segment; and
- wherein the control, responsive at least in part to determining the cylindrical coordinates of the ground point, determines a three-dimensional (3D) location of the trailer hitch at the vehicle.

2. The trailer assist system of claim 1, wherein the control generates a bounding box around the trailer hitch, and wherein the control detects the at least one feature of the trailer hitch within the bounding box.

3. The trailer assist system of claim 1, wherein a length of the vertical segment is based on a predetermined minimum possible height of the trailer hitch and a predetermined maximum possible height of the trailer hitch.

4. The trailer assist system of claim 3, wherein the control selects a portion of the vertical segment, and wherein the portion of the vertical segment comprises a potential ground point used in determining the 3D location of the trailer hitch at the vehicle.

5. The trailer assist system of claim 4, wherein the control applies a filter to a point of the portion of the vertical segment and determines if the point is within a threshold distance of the potential ground point.

6. The trailer assist system of claim 5, wherein the filter is applied to determine a minimum point of a function.

7. The trailer assist system of claim 5, wherein the control determines a plurality of individual z coordinates of points within the threshold distance and averages the determined z coordinates of the points within the threshold distance, and wherein the control determines a z coordinate of the 3D location of the trailer hitch based on the average.

8. The trailer assist system of claim 7, wherein the control determines an x coordinate and a y coordinate of the 3D location of the trailer hitch based on the determined z coordinate of the 3D location of the trailer hitch.

9. The trailer assist system of claim 1, wherein the control determines a respective 3D location of the trailer hitch in a plurality of image frames, and the control, responsive to determining the respective 3D locations, averages the respective 3D locations to determine an averaged 3D location of the trailer hitch.

10. The trailer assist system of claim 1, wherein the determined 3D location of the trailer hitch is used to maneuver the vehicle toward a trailer for hitching the trailer to the trailer hitch of the vehicle.

11. A method for determining a three dimensional (3D) location of a trailer hitch at a vehicle, the method comprising:
- providing a camera at a rear portion of a vehicle, the vehicle having a trailer hitch for hitching a trailer to the vehicle;
- capturing image data with the camera;
- receiving, at a control, image data captured by the camera and representative of a two dimensional (2D) image, the 2D image comprising an image of the trailer hitch;
- detecting, at the control, at least one feature of the trailer hitch at a Cartesian coordinate location;
- transforming, at the control, the Cartesian coordinate location of the at least one feature to a cylindrical coordinate location of the at least one feature;
- determining, at the control, a vertical segment that passes through the at least one feature at the cylindrical coordinate location;
- determining, at the control, a ground point along the vertical segment; and
- determining, at the control, the 3D location of the trailer hitch based at least on the determined ground point.

12. The method of claim 11, comprising maneuvering the vehicle toward a trailer, using the determined 3D location of the trailer hitch, for hitching the trailer to the trailer hitch of the vehicle.

13. The method of claim 11, wherein determining the vertical segment comprises determining a minimum potential hitch height and a maximum potential hitch height.

14. The method of claim 11, further comprising filtering, at the control, at least one point of the vertical segment to determine if the point is within a threshold distance of a potential ground point.

15. The method of claim 14, further comprising:
- determining, at the control, a plurality of individual z coordinates of points within the threshold distance;
- averaging, at the control, the determined z coordinates of the points within the threshold distance; and determining, at the control, a z coordinate of the 3D location of the trailer hitch based on the average.

16. A trailer assist system for a vehicle, the trailer assist system comprising:

a camera disposed at a rear portion of a vehicle and having a field of view exterior of the vehicle, the field of view encompassing a trailer hitch disposed at the vehicle;

a control comprising an image processor that processes image data captured by the camera, wherein the image data captured by the camera is representative of images of the trailer hitch viewed by the camera;

wherein, responsive to processing at the control of image data captured by the camera, the control generates a bounding box around the trailer hitch, and wherein the control detects at least one feature of the trailer hitch within the bounding box at a Cartesian coordinate location, and wherein the detected Cartesian coordinate location of the detected feature is transformed at the control to a cylindrical coordinate location;

wherein the control generates a vertical segment that passes through the detected feature;

wherein a length of the vertical segment is based on a predetermined minimum possible height of the trailer hitch and a predetermined maximum possible height of the trailer hitch;

wherein the control determines cylindrical coordinates of a ground point along the vertical segment; and wherein the control, responsive at least in part to determining the cylindrical coordinates of the ground point, determines a three-dimensional (3D) location of the trailer hitch at the vehicle.

17. The trailer assist system of claim 16, wherein the control selects a portion of the vertical segment, and wherein the portion of the vertical segment comprises a potential ground point used in determining the 3D location of the trailer hitch at the vehicle.

18. The trailer assist system of claim 17, wherein the control applies a filter to a point of the portion of the vertical segment and determines if the point is within a threshold distance of the potential ground point.

19. The trailer assist system of claim 18, wherein the filter is applied to determine a minimum point of a function.

20. The trailer assist system of claim 16, wherein the control determines a respective 3D location of the trailer hitch in a plurality of image frames, and the control, responsive to determining the respective 3D locations, averages the respective 3D locations to determine an averaged 3D location of the trailer hitch.

* * * * *